No. 849,969. PATENTED APR. 9, 1907.
T. W. BOX.
ANTI PIG ROOTING DEVICE.
APPLICATION FILED AUG. 2, 1906.
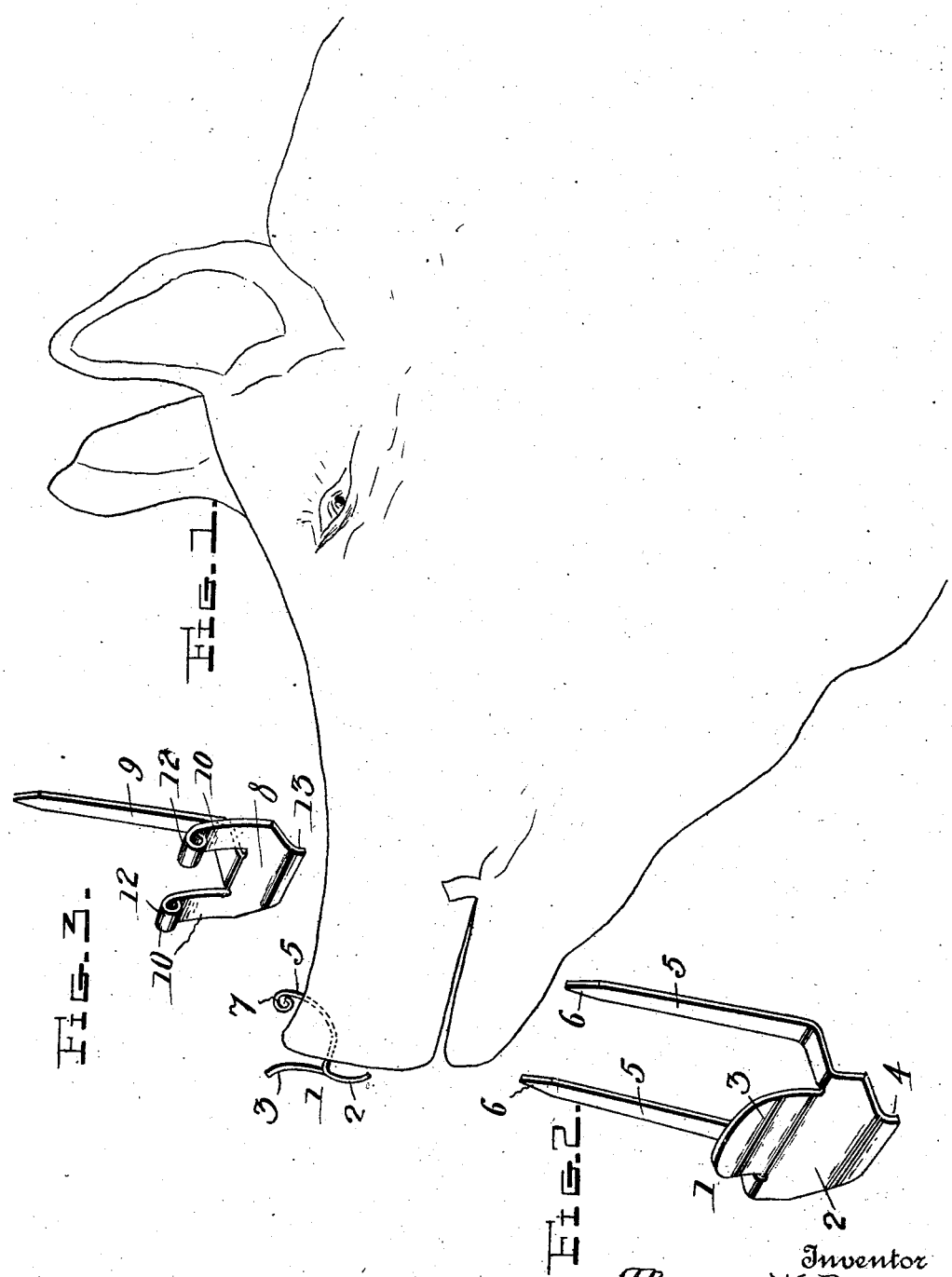
Witnesses
Jas. A. Koehl
C. H. Grieshauer
Inventor
Thomas W. Box.
by H. B. Willson & Co.
Attorneys

UNITED STATES PATENT OFFICE.

THOMAS WILLIAM BOX, OF PLYMOUTH, ENGLAND.

ANTI-PIG-ROOTING DEVICE.

No. 849,969.　　　　Specification of Letters Patent.　　　　Patented April 9, 1907.

Application filed August 2, 1906. Serial No. 328,918.

*To all whom it may concern:*

Be it known that I, THOMAS WILLIAM BOX, a subject of the King of Great Britain, residing at Plymouth, in the county of Devon, England, have invented certain new and useful Improvements in Anti-Pig-Rooting Devices; and I do declare the following to be a full, clear, and exact description of the invention, such as will enable others skilled in the art to which it appertains to make and use the same.

This invention relates to improvements in antirooting devices for pigs.

The object of the invention is to provide a device of this character which may be readily applied to the nose or snout of a pig and which when being applied will cause the animal comparatively little pain and which after being applied will effectively prevent the pig from rooting, but which will not in any manner interfere with feeding or otherwise inconvenience or annoy the animal.

With the above and other objects in view the invention consists of certain novel features of construction, combination, and arrangement of parts, as will be hereinafter described and claimed.

In the accompanying drawings, Figure 1 is a view of the pig's head, showing the application of the invention. Fig. 2 is a perspective view of the device, and Fig. 3 is a similar view showing a modified form of the device.

Referring more particularly to Figs. 1 and 2 of the drawings, 1 denotes the antirooting device, which is preferably formed from a single piece of sheet metal and comprises a plate 2, which is bent slightly outward at its upper edge, forming a lever 3. The plate 2 is also bent inwardly adjacent to its lower edge to form a lever 4, the plate being thus substantially in the form of a compound curve.

Formed integrally with each side edge of the plate are rearwardly-bent upwardly-curved attaching-prongs 5, said prongs being provided at their upper ends with sharpening-points 6, by means of which they are inserted through the cartilage at the upper portion of the pig's snout, as clearly shown in Fig. 1 of the drawings. After the prongs 5 have thus been inserted through the snout of the pig the outer ends of the prongs, which project above the snout, are bent or coiled, as shown at 7, thereby preventing the withdrawal of said prongs from the nose of the pig.

In applying the device to the pig's nose the prongs 5 are left sufficiently long to provide a space between the inner side of the plate 2 and the outer end of the pig's nose, thus preventing the plate from interfering with the pig's breathing. Should the pig attempt to root after the device has been applied to its nose, the upper edge or lever 3 of the plate 2 will come into engagement with the ground, thereby rocking the plate and pressing the lower inwardly-curved edge or lever 4 into forcible engagement with the pig's snout, thereby compressing or muffling the pig's nose, which will effectively prevent rooting or grubbing up of the ground.

In Fig. 3 of the drawings is shown a slightly-modified form of the invention. In this instance the device consists of the plate 8, on the upper edge of which is formed a centrally-disposed inwardly or rearwardly and upwardly bent single prong 9, adapted to be inserted through the cartilage of the snout in the same manner as described in connection with the first figures of the drawings. The upwardly-projecting end of the prong is coiled in the same manner to prevent the withdrawal of the device. The plate 8 is provided on each side of the prong 9 with upwardly-extending projections 10, the upper ends of which are curved outwardly and bent or coiled upon themselves, as shown at 12. The lower edge of the plate 8 is curved or bent inwardly, as shown at 13, said outwardly-curved projections 10 and the inwardly-curved lower edge 13 operating in the same manner as the lever edges 3 and 4 of the plate 2. (Shown in Figs. 1 and 2 of the drawings.) This latter form of the invention is intended to be used on small animals.

It will be noted that there are no rough or sharp cutting edges on the invention which might injure or unnecessarily annoy the animal, and by forming the device from a single piece of sheet metal the same may be stamped out and inexpensively produced in the form shown in either figures of the drawings.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. An antirooting device for pigs comprising a plate having an outwardly-curved upper edge and an inwardly-curved lower edge, and means whereby said plate is attached to the nose of the animal, substantially as described.

2. An antirooting device for pigs comprising a plate having an upper outwardly-curved portion and a lower inwardly-curved portion and integrally-formed attaching-prongs adapted to be inserted through the cartilage on the nose of the animal.

3. An antirooting device for pigs comprising a plate having an outwardly-curved upper portion and an inwardly-curved lower portion, rearwardly and upwardly bent attaching-prongs adapted to be inserted through the cartilage of a pig's nose and to project through and above the top of the nose or snout, said projecting ends of the prongs being adapted to be coiled thereby preventing the withdrawal of the same, substantially as described.

In testimony whereof I have hereunto set my hand in presence of two subscribing witnesses.

THOMAS WILLIAM BOX.

Witnesses:
SIMON STEPHENS,
EDWARD YOUNGS.